United States Patent [19]

Williams et al.

[11] 3,783,272

[45] Jan. 1, 1974

[54] OPTICAL-TO-ELECTRICAL TRANSDUCER ASSEMBLAGE

[75] Inventors: George Norman Williams; Robert F. Wilson, both of Seneca Falls, N.Y.

[73] Assignee: GTE Sylvania Incorporated, Seneca Falls, N.Y.

[22] Filed: July 10, 1972

[21] Appl. No.: 270,216

[52] U.S. Cl. .......... 250/216 R, 250/239

[51] Int. Cl. .......... H01j 5/16

[58] Field of Search .......... 250/213 R, 213 VT, 250/226, 216, 207, 217, 239; 313/95, 94, 96, 105; 340/173; 178/5.2 A, 5.4 AC, 5.4 CD, 5.4 ES

[56] References Cited

UNITED STATES PATENTS

| | | | |
|---|---|---|---|
| 3,035,179 | 5/1962 | Parker | 250/226 |
| 3,668,388 | 6/1972 | Fisher | 313/95 |
| 2,834,005 | 5/1958 | Ketchledge | 250/226 |
| 3,502,888 | 3/1970 | Stites | 250/226 |
| 3,270,611 | 9/1966 | Gelertner | 250/226 |
| 3,210,552 | 10/1965 | Young | 250/226 |
| 2,797,256 | 6/1957 | Millspaugh | 250/226 |
| 3,527,540 | 9/1970 | Bowker | 250/216 |

*Primary Examiner*—James W. Lawrence
*Assistant Examiner*—D. C. Nelms
*Attorney*—Norman J. O'Malley et al.

[57] ABSTRACT

A packaged assemblage is provided for an optical-to-electrical signal transducer employed in a system for displaying a film image on the screen of a CRT display device. The assemblage includes a condensing lens, a related plural-mirror system, and a single multi-channel photomultiplier tube all of which are compactly arranged in optical alignment within a plural-sided, light-tight and dust-free enclosure. The desired compaction of the assemblage is achieved within the walled enclosure by orienting the tube in a manner that its longitudinal axis is parallel with the optical axis of the condensing lens.

5 Claims, 5 Drawing Figures

OPTICAL-TO-ELECTRICAL TRANSDUCER ASSEMBLAGE

CROSS-REFERENCE TO RELATED APPLICATION

This application contains matter disclosed but not claimed in a related application filed concurrently herewith and assigned to the assignee of the present invention. This related application is Ser. No. 270,217, filed July 10, 1972 Attorney's docket D-7059, "Signal Transducer Incorporating a Multi-Channel Photomultiplier Tube."

BACKGROUND OF THE INVENTION

This invention relates to the packaging of an optical-to-electrical signal transducer utilized in a system for displaying film imagery on the screen of a cathode ray tube display device, and more particularly to a compact signal transducer assemblage employing a single multi-channel photomultiplier tube.

There is an existent desire among the television viewing public, as well as in specialized commercial, industrial and educational endeavors, to utilize television receivers and related types of cathode ray tube display devices for presenting predetermined program displays of slide transparencies, film strips, and movies. It has been found that a television type of display device, such as a receiver or monitor, manifests several significant advantages over an optical projection type of display. Film mediums optically projected in a conventional manner usually require a viewing environment having a very low level of ambient light such as that evidenced in a darkened room. Most of the cooling means associated with the high intensity lamps, necessarily employed in optical projectors, commonly produce ambient noise of an annoying and distracting level. And, in addition, optical projectors ordinarily have little or very limited means to compensate for inconsistencies and degradations that may be present in the film image quality. In contrast thereto, the foregoing exemplary disadvantages, generally inherent in optical projection, are adequately overcome in a cathode ray tube type of display presentation.

Advantageous results have been achieved by employing an image reproduction system utilizing a flying spot scanner tube to provide a beam of moving light to scan the image area of a film, an optical-to-electrical transducer for converting the optical information, derived from scanning the film image, to corresponding electrical signals, and a signal processing means wherefrom the signals are suitably applied to a cathode ray tube display device adapted to reproduce the desired image display on the screen thereof. Such systems, when adapted to color imaging, conventionally utilize a plurality of photomultiplier tubes, usually one for each channel which are arranged to handle the additive primary signals, i.e., red, blue and green. The bulkiness of using and packaging an assemblage of three tubes, along with the associated optical components essential to the system, necessitates space requirements which become problematical, since it is both desirable and expeditious to contain the system into as small a package as possible. In an effort to compact the bulky triple tube system, additional optics have been incorporated which tend to reduce the efficiencies of the system and limit the degree of compaction. In addition, in the plural tube system employing the separate but related photomultipliers, non-uniform aging between the respective tubes often necessitates periodic gain adjustments of the individual tubes in order to attempt to maintain the proper color balance of the system. What has been found is that the sensitivity and the spectral response characteristics of a photomultiplier tube are apt to change under both shelf-life storage and normal operational conditions. Such deviations are primarily due to variations in the residual gas pressure and changes in material compositions within the individual tubes. Usually, each tube has its own characteristic aging which is determined by its previous processing history. Thus, the cooperative usage of a plurality of separate multiplier tubes in the same system inherently introduces not only bulkiness but also differential performance variables which, over a period of time, may noticeably affect the quality of the overall output of the video system. Thus, the conventional packaged assemblage, being of a relatively large volume necessitated by the plurality of tubes and associated optics, is a drawback to the efficient utilization of available space, hinders the achievement of aesthetic design, and may present an output of variable quality.

OBJECTS AND SUMMARY OF THE INVENTION

It is an object of the invention to reduce the aforementioned disadvantages by providing a compact assemblage for an optical-to-electrical signal transducer.

Another object of this invention is to provide a compact signal transducer package that employs a reduced number of components arranged in an efficient manner to produce an improvement in space utilization and operational results.

These and other objects and advantages are achieved in one aspect of the invention wherein a compactly packaged optical-to-electrical signal transducer is employed to convert optical imagery to an electrical signal output translatable to form a reproduction of the imagery on the screen of a television display device. The compact transducer assemblage expeditiously utilizes an input condensing lens having an optical axis, a plural mirror system aligned therewith, and a single multi-channel photomultiplier tube having its longitudinal axis parallel with the optical axis of the condensing lens. The assemblage is contained within a plural-sided opaque enclosure providing a dust-free and light-tight enclosure environment.

DESCRIPTION OF THE PREFERRED EMBODIMENT

For a better understanding of the present invention, together with other and further objects, advantages, and capabilities thereof, reference is made to the following specification and appended claims in connection with the aforedescribed drawings.

The various lens designations denoted in the several figures are not to be considered limiting as a variety of lens configurations and multiple lens combinations may be utilized to fulfill the intended optical functions. Similarly, the term "lens" as used in the specification and appended claims is also intended to broadly encompass a variety of lens configurations and combinations.

Figure 1:
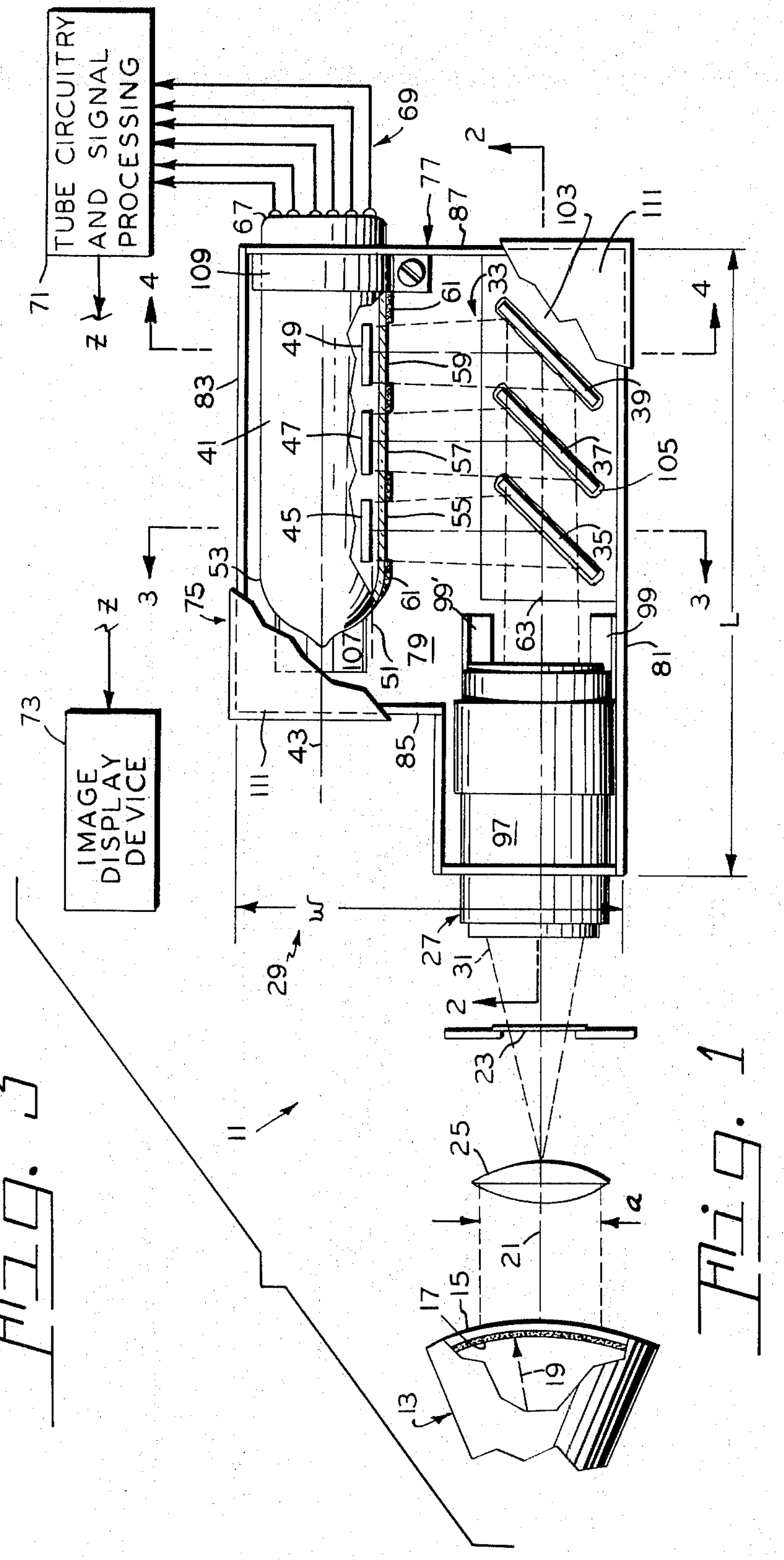
FIG. 1 is a diagrammatic view illustrating a film image reproducing system employing the compact optical-to-electrical signal transducer of the invention, looking vertically into the packaged transducer assemblage.
Figure 4:
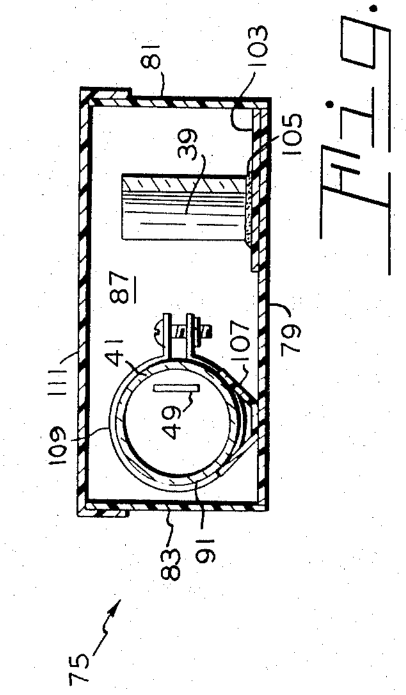
FIG. 4 is an opposed end elevation of the assemblage taken along the line 4—4 of FIG. 1.
Figure 3:
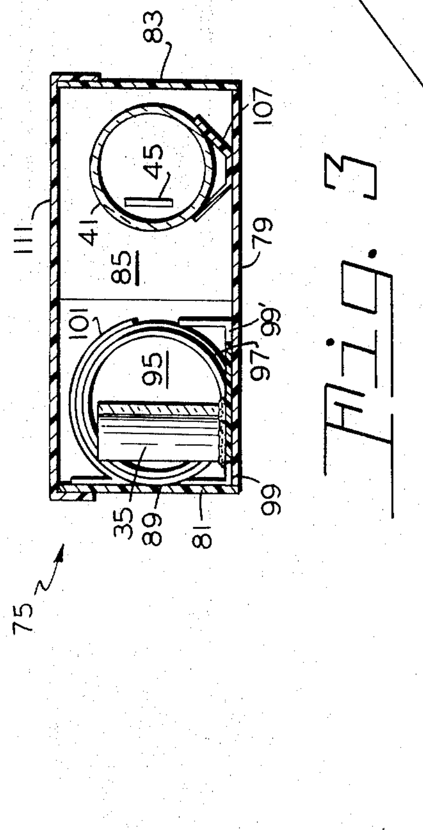
FIG. 3 is an internal end elevation of the transducer package taken along the line 3—3 of FIG. 1.

In referring to FIG. 1, there is shown an optical-to-electrical signal transducer system 11 which is utilized in effecting the display of film imagery on the screen of a cathode ray tube display device. Included in the system is a light scanning source such as a flying spot scanner cathode ray tube 13 having a faceplate portion 15 whereupon a cathodoluminescent screen 17 is interiorly disposed. A selected area of this screen is excited to luminescence by a controlled electron beam 19 to provide a moving beam of scanning light 21 defined within the raster area *a*. This luminescent raster pattern is focused on the image area 23 of a film medium by an objective lens 25.

The moving beam of scanning light, upon passing through the film imagery 23, is modulated or modified in accordance with the density of the dyes contained therein. The modulated light is thence collected by the condensing lens 27 of the optical-to-electrical transducer unit 29 wherein the input of optical information is converted to an output of electrical signals.

Figure 2:
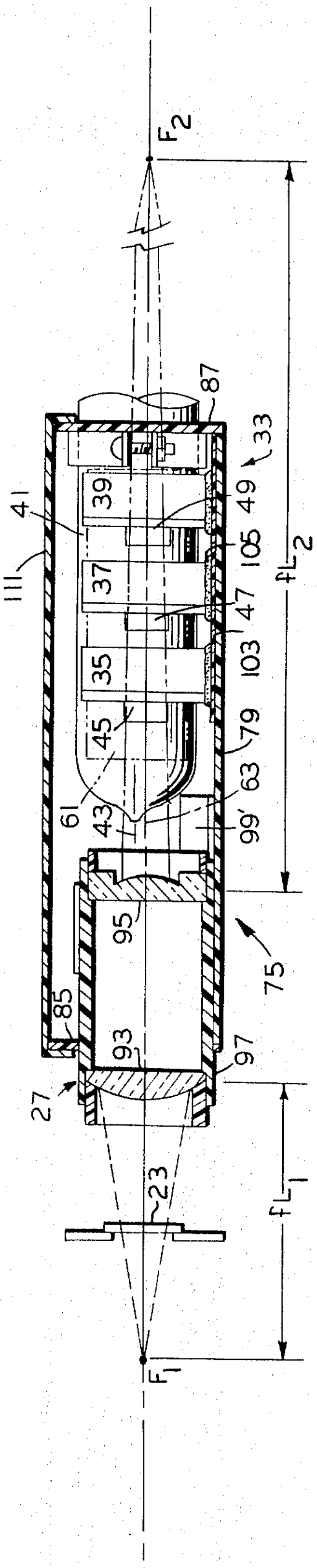
FIG. 2 is a side elevation of the transducer assemblage of the invention taken along the line 2—2 of FIG. 1.

More explicitly, with particular reference to FIGS. 1 and 2,. the image-modulated or diffused light 31 is directed by the condensing lens system 27 to a tandemly-arranged system of differentially selective reflective surfaces in the form of first and second beamsplitting dichroic mirrors 35 and 37 respectively; which are selective filter means known in the art for splitting or dividing incident light into red, blue and green color components. These mirrors are arranged in optical alignment and spaced relationship in conjunction with a sequentially oriented broadband front-surface reflective mirror 39. This system of discrete mirrors directs the separated color components of the image-modulated light to separate cathode areas of a single photomultiplier tube 41. As shown, this tube is an elongated multichannel structure having a longitudinal axis 43. Of the internal structure only the plurality of separated cathode areas 45, 47, and 49 are shown. These are longitudinally oriented in an in-line manner in a common plane 51 substantially parallel to the axis 43 of the tube. Each of the separate cathode areas has an associated window area in the tube envelope 53, such being defined respectively as 55, 57, and 59 by opaque masking means 61 disposed relative to the exterior of the tube envelope. For a detailed description of a multichannel photomultiplier tube, reference is directed to U.S Pat. No. 3,668,388 by M. B. Fisher et al. and assigned to the assignee of the present invention. As illustrated, the longitudinal axis of the tube 43 and the optical axis of alignment 63 of the transducer assemblage are in a substantially common plane. Similarly, the longitudinal axis of the tube is substantially parallel with the optical axis of the condensing lens 27 which is coincident with the optical axis of alignment 63.

Extending exteriorly from the base portion 67 of the tube are a plurality of individual conductive leads 69 which effect means for electrically connecting the internal elements of the tube with the associated tube and signal processing circuitry 71. This external circuitry translates the electrical input signals to appropriate output signals of the type usable in the image display device 73 to effect a reproduction display of the color film image 27. These output signals are conveyed to the CRT display device by wire or wireless means as indicated by the connection Z—Z.

In referring to FIGS. 1 through 4, the assemblage of the transducer 29 is contained within a plural-sided, box-like opaque enclosure structure 75 having a flat black non-reflective interior finish and formed, for example, of metal or rigid and thermally-stable plastic material. The enclosure has length L and width W dimensions and upstanding connecting walls 77 formed normal to a common base portion 79. The upstanding walls on the length dimension L are substantially referenced as first and second sidewalls 81 and 83 respectively; while the walls on the width dimension W are substantially referenced as first and second endwalls 85 and 87 respectively. The first endwall has an "alpha" opening 89 therein adjacent to the first sidewall 81 to accommodate the condensing lens 27; and the second endwall has a "beta" opening 91 therein adjacent to the second sidewall 83 to accommodate the insertion, removal and positioning of the multi-channel tube 41 within the structure.

The condensing lens 27, in this instance, is an optics system comprising a collector 93 and related fresnel 95 lenses positioned in a lens housing 97. The condensing lens or optics system 27 has an optical axis 63, and front and back focal lengths, $f1_1$ and $f1_2$, of differing values. The object plane or film image 23 is positioned within the front focal length $f1_1$ the focal point $F_1$ being forward thereof; thus, the modulated light conveyed by the condensing optics is diffused which reduces discernible shading in the modulated light. In addition, the in-line cathode areas 45, 47 and 49 in the multi-channel tube 41 are within the back focal length $f1_2$ of the condensing system, the focal point $F_2$ being oriented appreciably therebeyond. Therefore, the image-modulated light energy impinging the respective cathode areas is further de-focused or diffused to minimize vertical and horizontal shading, thereby substantially fulfilling the desideratum of providing pulsing light energy of varying density.

The condensing lens 27 is suitably located by positioning means 99 and 99' affixed to the base portion 79 in a manner to provide alignment with the opening 89 in the first endwall 85 and allow controlled movement of the lens along the optical axis. A peripheral retaining means 101 is formed to at least partially encircle the lens housing 97 and facilitate optical adjustment and retention of the lens system 27.

The tandemly-arranged mirror system 33 comprising the two selective dichroic beamsplitters 35 and 37 and the front surface reflector 39 are sequentially arranged to make angles of incidence of substantially 45 degrees with the optical axis 63 of the condensing lens. The first dichroic mirror 35 exhibits an optical filter characteristic which selectively reflects a defined range of spectral emission defining one color component of the diffused incident light beam, as for example red, directing the same through the envelope window 55 to impinge the end cathode area 45. The remainder of the modified light beam incident on the first dichroic 35 passes therethrough and strikes the second dichroic mirror 37. This mirror, manifesting a different filter characteristic, selectively reflects and directs a different range of spectral emission representing a second color component of the diffused light, as for example blue, through the envelope window 57 to impinge the middle cathode area 47. The remaining incident light passed by the second dichroic mirror 37, representing a third color emission component of the color film imagery, as for example green, contacts the front surface mirror 39 and is angularly directed through the window 59 to impinge the third or end cathode area 49. The opaque masking means 61 defining the envelope windows minimizes cross-talk between channels.

The three mirrors of the mirror system 33 are oriented relative to the base portion 79 of the enclosure 75 by a removable mirror system base plate 103. The mirror elements are affixed normal thereto by suitable means such as channels or bonding attachment. As shown, bonding attachment 105 is utilized in the described embodiment. The positioning of the mirror system reflects the light transmitted by the condensing lens 27 through an angle of substantially 90° to selectively impinge the aforedescribed separate cathode areas in the tube 41.

The multi-channel photomultiplier tube is positioned in a light-tight manner through the "beta" opening 91 in the second endwall 83 in a manner that the respective in-line cathode areas are substantially parallel with and facing the first sidewall 81 of the enclosure. The tube is aligned with the endwall opening 91 by tube positioning means 107 affixed to the enclosure base portion 79. As illustrated, the tube positioning means is formed as a longitudinal channel member providing a supporting cradle for the tube in a plane substantially parallel with the closure bottom portion. The tube is positioned with the base 67 thereof extending exteriorly of the second endwall 87 through the "beta" opening 91 therein and secured by associated tube affixation means 109.

To complete the enclosure, a lid or top closure means 111 is fashioned to snugly fit the box-like structure to provide a unit having a light-tight and dust-free internal environment.

Figure 5:
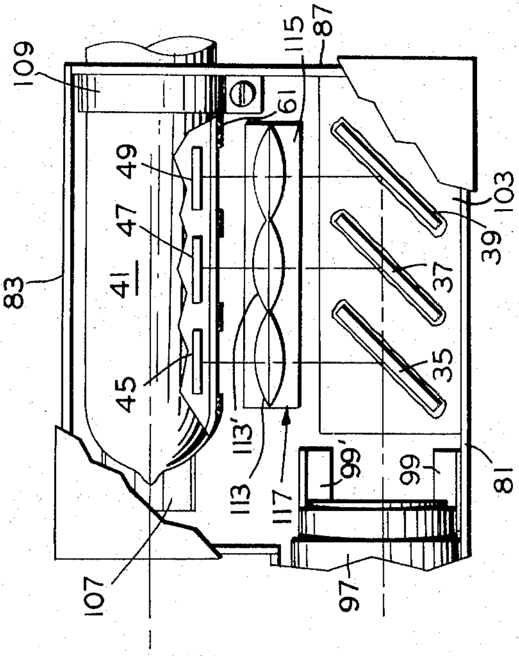
FIG. 5 is a partial plan view of the transducer package, looking vertically thereinto, showing the orientation of a secondary lens structure.

With reference to FIG. 5, in some transducer constructions it has been found beneficial to augment the condensing lens system 27 by utilizing at least one secondary condensing lens 113 to better control the area and direction of the diffused light to a respective cathode area. Whether one or more such lenses be employed, it has been found expeditious to affix the secondary lens/lenses to a movable mounting plate 115 attached to the enclosure base portion 79 in the longitudinal region between the mirror system 33 and the tube 41. These lenses, for example, may be constituted of glass or of a suitable plastic material selected from the group consisting essentially of optical grades of acrylic and polystyrene materials. Such lenses may be integrally formed as a one-piece unit to beneficially provide a compact plural lens structure 117.

While the transducer assemblage enclosure 75 is a substantially rectangularly shaped structure, it has been found advantageous, in achieving the desired compaction, to modify two of the upstanding walls as shown in FIG. 1. The first sidewall 81 of the enclosure has an unbroken length that exceeds the expansive length of the second sidewall 83 which is a stepped construction. The second endwall 87 has an unbroken length exceeding that of the first endwall 85 which is also of a stepped construction.

Thus, a compact assemblage is expeditiously provided for an optical-to-electrical signal transducer. The assemblage package employs a reduced number of components arranged in an efficient manner to produce a marked improvement in space utilization and operational results.

While there have been shown and described what are at present considered the preferred embodiments of the invention, it will be obvious to those skilled in the art that various changes and modifications may be made therein without departing from the scope of the invention as defined by the appended claims.

What is claimed is:

1. A compact assemblage for an optical-to-electrical signal transducer utilized in an optically aligned system for displaying film images on the screen of a cathode ray tube display device wherein the optical information resultant from scanning the film area with a moving beam of radiant energy is electrically processed and applied to the display device, said optical-to-electrical signal transducer assemblage comprising:

a plural-sided box-like opaque enclosure structure having length and width dimensions and upstanding connecting walls normal to a common base portion, said walls on said length dimension being substantially referenced as first and second sidewalls respectively and those on said width dimension being substantially referenced as first and second endwalls respectively, the interior of said box-like structure being of a flat black non-reflective finish, said first endwall having an alpha opening therein adjacent said first sidewall, said second endwall having a beta opening therein adjacent said second sidewall;

a condensing lens positioned in a light-tight manner in said alpha opening of said first endwall, said condensing lens being a multi-element unit in a common housing having an optical axis therethrough and differing front and back focal lengths, the plane of said film image being within the front focal length of said condensing lens, said condensing lens housing being movable along said optical axis to facilitate fine optical adjustment of said assemblage;

a multi-channel photomultiplier tube having a longitudinal axis and a plurality of separated mask-defined cathode areas longitudinally located in an in-line manner in a plane substantially parallel to the axis of said tube, said cathode areas being within the back focal length of said condensing lens, said multi-channel tube being positioned in a light-tight manner in said beta opening of said second endwall with said cathode areas substantially facing said first sidewall;

longitudinal photomultiplier tube positioning means affixed to said base portion in alignment with said beta opening in said second endwall, said tube positioning means providing longitudinal cradle-like support for said tube in a plane substantially parallel with said closure bottom portion, said tube being oriented with the base portion thereof extending exteriorly of said second endwall through said beta opening to provide means for longitudinal adjustment of said tube and facilitate placement therein and removal thereof from said enclosure structure;

a tandemly-arranged mirror system including at least one selective beam splitter and a first surface mirror whereof all components are similarly positioned aft of said condensing lens and sequentially arranged to make like angles of incidence of substantially 45 degrees with the optical axis of said condensing lens;

mirror system positioning means oriented relative to the base portion of said enclosure, said mirror system being positioned to reflect the light transmitted by the condensing lens through an angle of 90 degrees to selectively impinge said separate cathode areas; and top closure means formed to fit said enclosure structure to provide a unit having a light-tight and dust-free internal environment.

2. The assemblage according to claim 1 wherein the first sidewall of said enclosure structure has an unbroken length exceeding that of said second sidewall, said second sidewall being of stepped construction and wherein the second endwall of said enclosure has an unbroken length exceeding that of said first endwall, said first endwall being of stepped construction.

3. The assemblage according to claim 1 wherein said mirror system positioning means is a removable structure formed with a base plate having the beamsplitting and mirror components affixed normal thereto.

4. The assemblage according to claim 1 wherein a secondary condensing lens means is utilized for at least one of said cathode areas, said secondary lens being affixed to a movable mounting plate attached to said enclosure base portion in the region between said mirror system and said tube.

5. The secondary lens means according to claim 4 wherein a discrete lens portion is supplied for at least two of the respective cathode areas to provide a plural lens structure, said plural lens structure being an integral unit of a plastic material selected from the group consisting essentially of optical grades of acrylic and polystyrene materials.

* * * * *